(12) United States Patent
Matsuzawa et al.

(10) Patent No.: US 10,974,384 B2
(45) Date of Patent: Apr. 13, 2021

(54) FORCE DETECTING DEVICE AND ROBOT SYSTEM

(71) Applicant: Seiko Epson Corporation, Tokyo (JP)

(72) Inventors: Akira Matsuzawa, Shiojiri (JP); Sho Nakano, Matsumoto (JP); Hidekatsu Miyasaka, Matsumoto (JP)

(73) Assignee: Seiko Epson Corporation

( * ) Notice: Subject to any disclaimer, the term of this patent is extended or adjusted under 35 U.S.C. 154(b) by 227 days.

(21) Appl. No.: 16/190,295

(22) Filed: Nov. 14, 2018

(65) Prior Publication Data

US 2019/0143509 A1 May 16, 2019

(30) Foreign Application Priority Data

Nov. 15, 2017 (JP) .............................. JP2017-219581

(51) Int. Cl.
*B25J 9/16* (2006.01)
*B25J 19/02* (2006.01)
*B25J 13/08* (2006.01)
*B25J 9/00* (2006.01)

(52) U.S. Cl.
CPC ........... *B25J 9/1633* (2013.01); *B25J 9/0009* (2013.01); *B25J 13/085* (2013.01); *B25J 19/02* (2013.01)

(58) Field of Classification Search
CPC ........ B25J 13/085; B25J 19/02; B25J 9/0009; B25J 9/1633
See application file for complete search history.

(56) References Cited

U.S. PATENT DOCUMENTS

| | | | |
|---|---|---|---|
| 5,003,825 A * | 4/1991 | Lew ...................... | G01L 9/0013 73/704 |
| 2016/0229067 A1* | 8/2016 | Nishimura ............. | B25J 13/085 |
| 2018/0147733 A1* | 5/2018 | Takeuchi ............. | B25J 19/0054 |
| 2018/0283966 A1* | 10/2018 | Matsuzawa ........... | H01L 41/313 |
| 2018/0326598 A1* | 11/2018 | Miyasaka ................ | B25J 9/047 |

FOREIGN PATENT DOCUMENTS

JP 2016-145754 A 8/2016

* cited by examiner

*Primary Examiner* — Francis C Gray
(74) *Attorney, Agent, or Firm* — Harness, Dickey & Pierce, P.L.C.

(57) ABSTRACT

A force detecting device includes a recess located on the outer surface of the force detecting device and an electric connector provided in the recess. An electric cable for the force detecting device attached to the electric connector is inserted into the through-hole.

9 Claims, 10 Drawing Sheets

FORCE DETECTING DEVICE AND ROBOT SYSTEM

BACKGROUND

1. Technical Field

The present invention relates to a force detecting device and a robot system including the force detecting device.

2. Related Art

In a robot including an end effector and a robot arm, a force detecting device that detects a force applied to the end effector has been used (e.g., JP-A-2016-145754 (Patent Literature 1)).

However, an electric cable for the force detecting device is disposed around the force detecting device. Therefore, the electric cable is likely to interfere with peripheral jigs and tools and work to cause deviation of setting positions of the peripheral jigs and tools and the work. This makes it difficult to lay out the electric cable.

SUMMARY

An advantage of some aspects of the invention is to solve the problem described above, and the invention can be implemented as the following aspects.

(1) According to a first aspect of the invention, a force detecting device mounted on a robot arm including an arm including a through-hole is provided. The force detecting device includes: a recess located on an outer surface of the force detecting device; and an electric connector provided in the recess. A space is formed by the arm and the recess. An electric cable for the force detecting device attached to the electric connector is inserted into the through-hole.

With this force detecting device, since the force detecting device has structure in which the electric cable for the force detecting device is insertable into the through-hole of the arm from the recess located on the outer surface of the force detecting device, the electric cable can be inserted into the through-hole of the arm without being drawn around on the outside of the force detecting device. Therefore, it is possible to reduce likelihood that the electric cable for the force detecting device causes interference with other objects such as other cables. It is easy to lay out the electric cable.

(2) In the force detecting device, the electric cable may be inserted into the through-hole after being spirally drawn around in the space.

With this force detecting device, it is possible to reduce likelihood that excessive stress occurs in the electric cable according to a change in a posture of the robot arm.

(3) The force detecting device may further include: a substantially ring-shaped first connecting member connected to the arm; and a second connecting member connected to an end effector.

(4) The force detecting device may further include a side surface member provided between the first connecting member and the second connecting member. The side surface member may include a plurality of notched sections provided in an outer circumference of the side surface member. The first connecting member may include a plurality of screw insertion holes into which a plurality of fixing screws operated from the plurality of notched sections of the side surface member are inserted, a plurality of fixing screws used for connection of the first connecting member and the arm being inserted into the plurality of screw insertion holes.

With this force detecting device, since the fixing screws are operated from the notched sections of the side surface member, it is unnecessary to increase the outer diameter of the first connecting member in order to form insertion holes for the fixing screws. As a result, it is possible to reduce the outer diameter of the entire force detecting device.

(5) In the force detecting device, a plurality of female screw holes for attaching a handle for direct teaching to the second connecting member may be provided on an outer circumferential surface of the second connecting member.

With this force detecting device, since the handle for direct teaching is attached to the force detecting device, it is possible to easily perform the direct teaching.

The invention can be implemented as various aspects other than the aspects explained above. For example, the invention can be realized as an aspect such as a robot system including the force detecting device and a robot.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
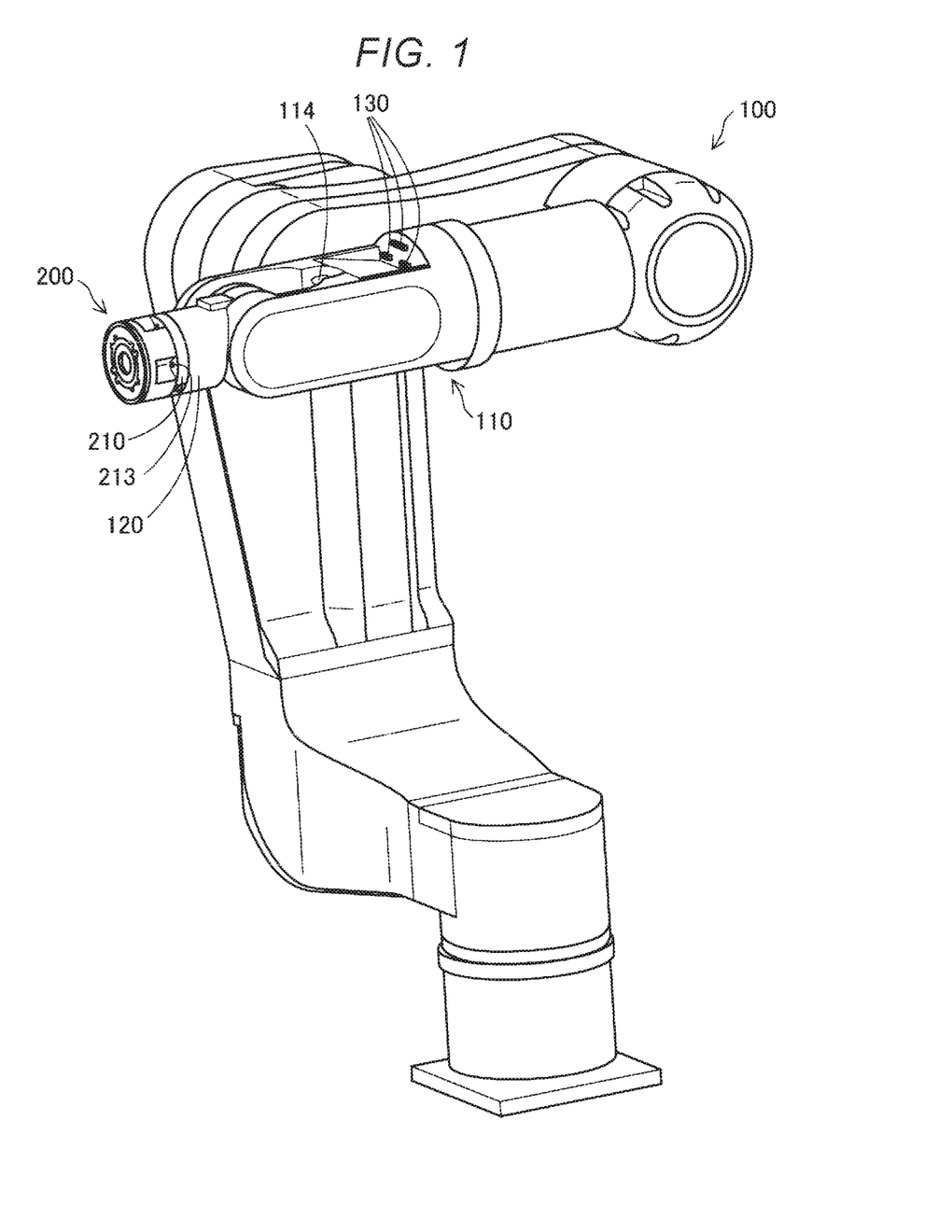
FIG. 1 is a perspective view of a robot system.

FIG. 1 is a perspective view of a robot system in an embodiment. The robot system includes a robot 100 including a robot arm 110 and a force detecting device 200 connected to the distal end of the robot arm 110. Various end effectors are connectable to the end of the force detecting device 200. However, illustration of an end effector is omitted in FIG. 1.

In this embodiment, the force detecting device 200 is a six-axis force sensor capable of detecting six-axis components of an external force applied to the force detecting device 200. The six-axis components are translational force (shearing force) components in respective directions of three axes orthogonal to one another and rotational force (moment) components around the respective three axes. Note that the force detecting device 200 may be configured as force sensors of types other than the six-axis force sensor.

An arm end 120 mountable with the end effector or the force detecting device 200 is provided at the distal end of the robot arm 110. The arm end 120 is a part of the robot arm 110. The force detecting device 200 is directly connected to the arm end 120. However, an auxiliary flange (an auxiliary connecting member) may be interposed between the arm end 120 and the force detecting device 200.

Figure 2:
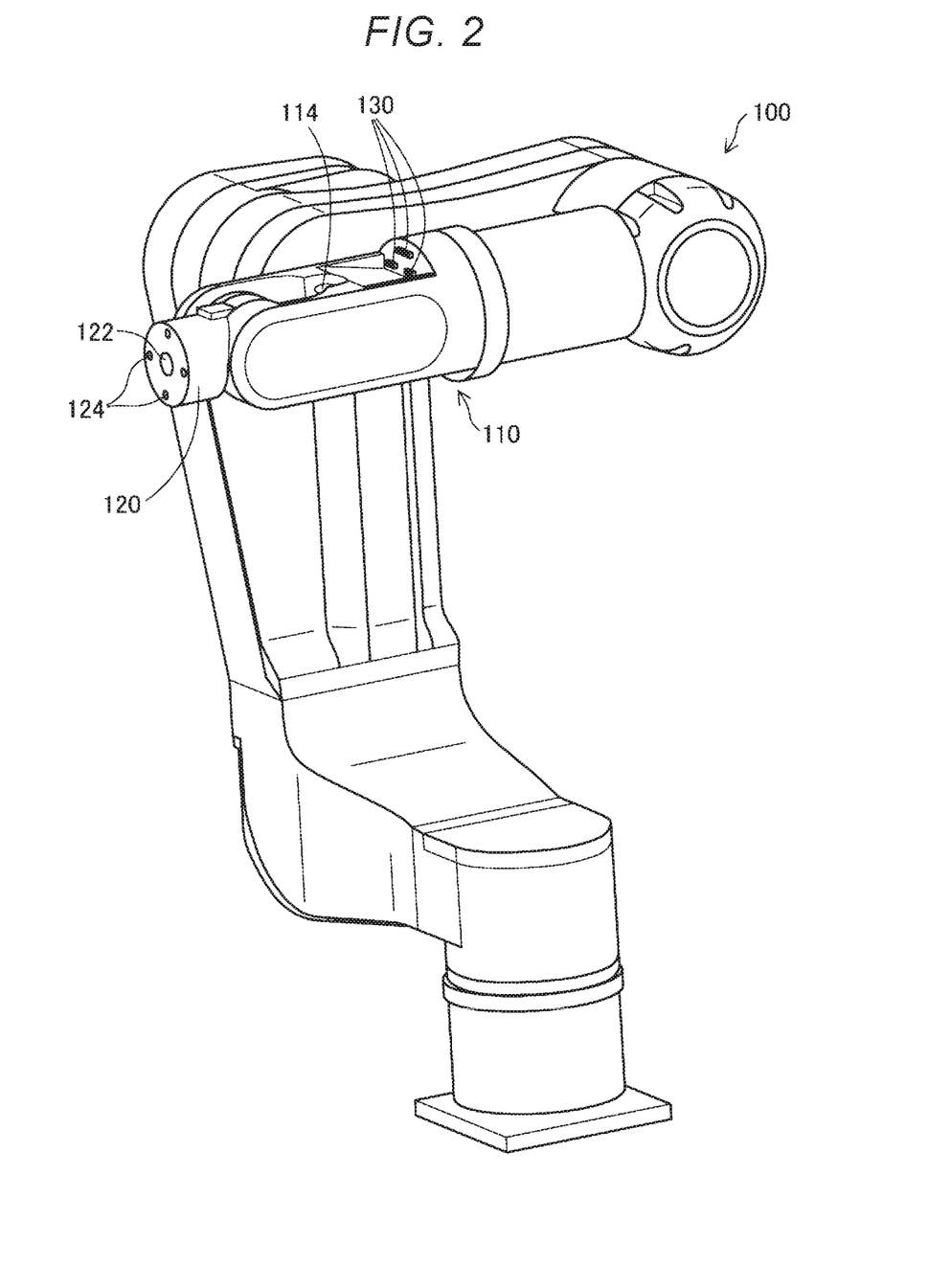
FIG. 2 is a diagram showing a robot in a state in which a force detecting device is detached from the robot.

FIG. 2 shows the robot 100 in a state in which the force detecting device 200 is detached from the robot 100. A through-hole 122 is formed in the arm end 120 of the robot 100 along the center axis of the arm end 120. The through-hole 122 of the arm end 120 is usable to guide an electric cable or the like of the end effector or the force detecting device 200. A plurality of female screw holes 124 usable for connection to the end effector or the force detecting device 200 are provided on the end face of the arm end 120. Note that the through-hole 122 does not need to be formed in the center of the arm end 120. However, the through-hole 122 desirably pierces through the arm end 120 in a direction along the center axis of the arm end 120.

A draw-out hole 114 for drawing out the electric cable from the inside to the outside of the robot arm 110 is provided on the side surface of the robot arm 110. Further, a plurality of electric connectors 130 are provided on the side surface of the robot arm 110 further on the rear end side than the draw-out hole 114. The electric connectors 130 are usable to connect an electric cable for the force detecting device 200 and an electric cable for the end effector.

Figure 3:
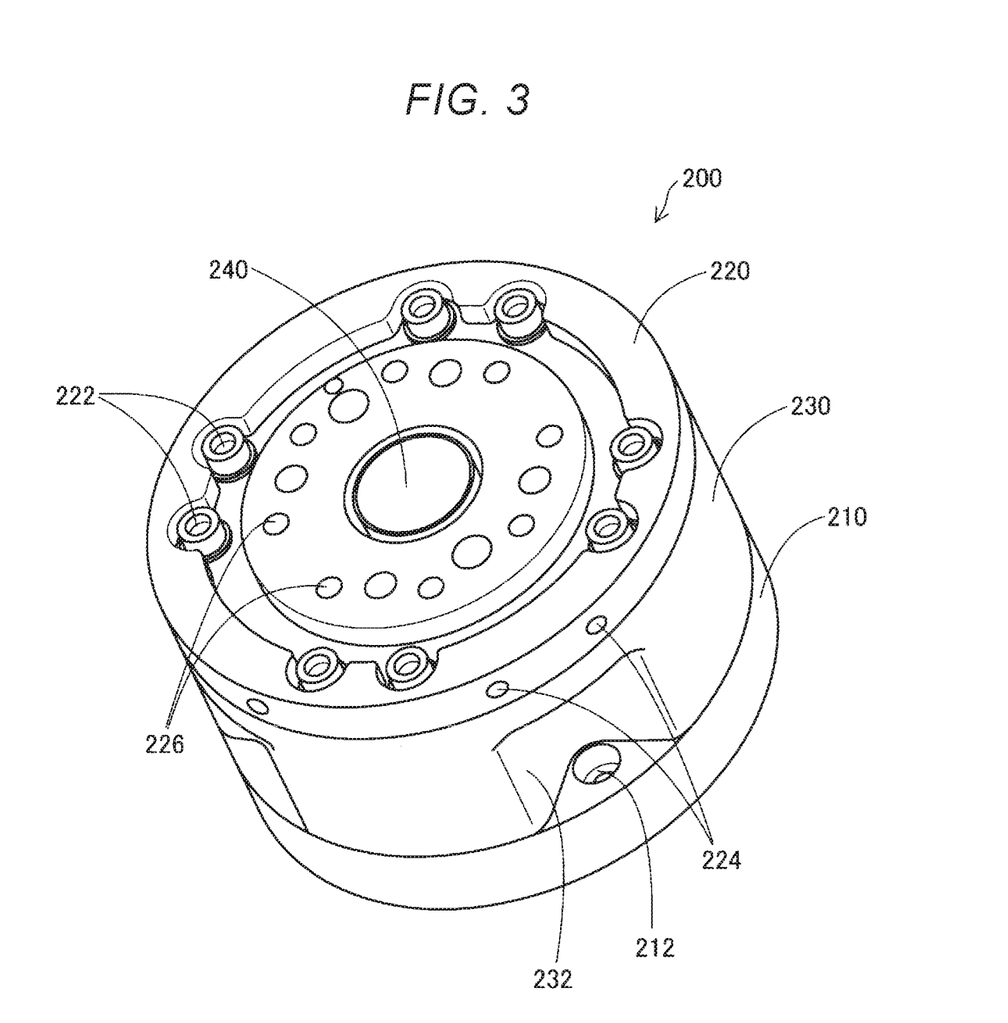
FIG. 3 is a perspective view of the force detecting device.
Figure 4:
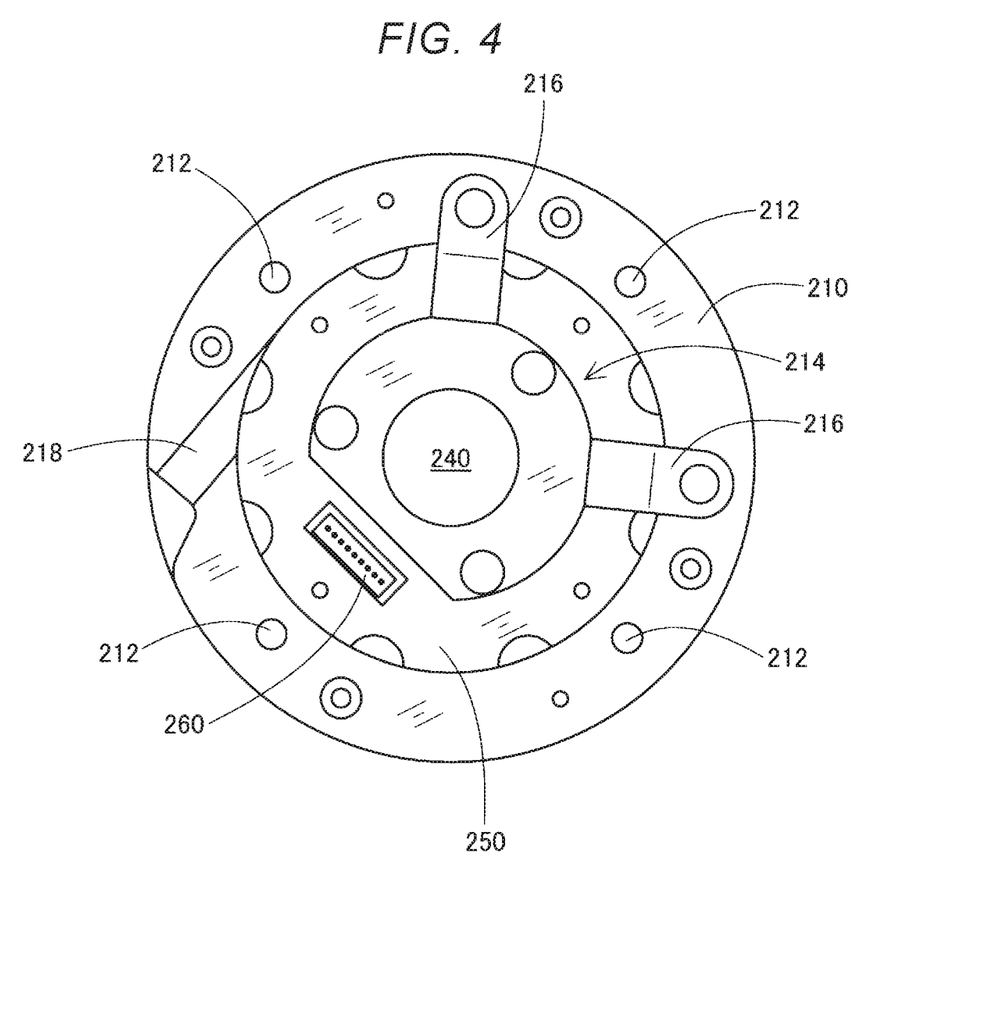
FIG. 4 is a bottom view of the force detecting device.

FIG. 3 is a perspective view of the force detecting device 200. FIG. 4 is a bottom view of the force detecting device 200. The force detecting device 200 includes a first connecting member 210 connectable to the arm end 120 and a second connecting member 220 connectable to the end effector. A side surface member 230 is provided between the first connecting member 210 and the second connecting member 220. A through-hole 240 piercing through the entire force detecting device 200 is provided in the center of the force detecting device 200 along the center axis of the force detecting device 200. As explained below, the through-hole 240 is usable to cause the electric cable for the end effector to pass. The first connecting member 210 side of both sides of the force detecting device 200 is referred to as "arm end side" and the second connecting member 220 side of both the sides is referred to as "end effector side".

The first connecting member 210 includes a plurality of screw insertion holes 212 into which a plurality of fixing screws 213 (see FIG. 1) used for connection to the arm end 120 are insertable. Female screws may be formed or may not be formed on the inner surfaces of the screw insertion holes 212. The screw insertion holes 212 shown in FIG. 3 include housing recesses in which the heads of the fixing screws 213 are housed. However, the housing recesses for the heads can be omitted. As shown in FIG. 4, the first connecting member 210 is a substantially ring-shaped member. A recess 214 located on the outer surface of the force detecting device 200 is provided in the force detecting device 200. In this embodiment, the recess 214 is provided on the inner circumference side of the first connecting member 210 on the bottom surface on the arm end side of the force detecting device 200. The recess 214 is defined by the substantially ring-shaped first connecting member 210 and a tabular member 250 provided on the inside of the force detecting device 200. A plurality of force detecting elements and electric circuits of the force directing elements are housed in a space between the tabular member 250 and the second connecting member 220. However, details of the force detecting elements and the electric circuits are omitted.

An electric connector 260 of the force detecting device 200 is provided in the recess 214. In this embodiment, the electric connector 260 is formed in a position accessible via an opening of the tabular member 250. Clamps 216 are provided on the bottom surface of the first connecting member 210 in order to fix an electric cable. The clamps 216 are fixable to the first connecting member 210 by screws such as bolts and used according to necessity. A space is formed between the recess 214 and the robot arm 110 (i.e., the arm end 120).

Figure 5:
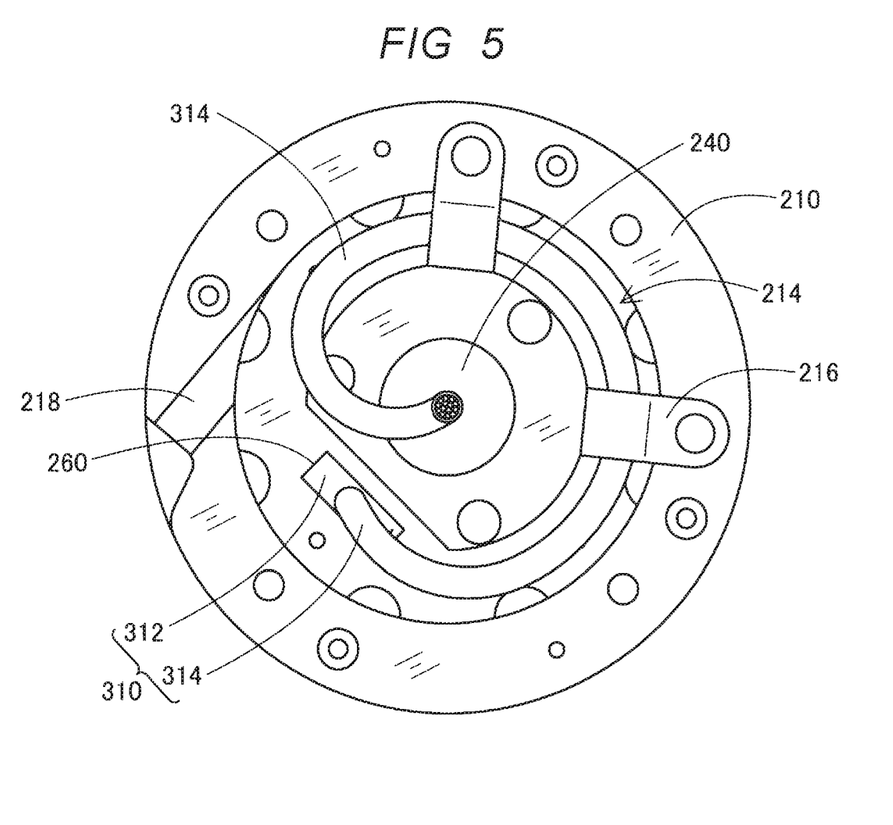
FIG. 5 is a diagram showing a state in which an electric cable for the force detecting device is drawn out from a through-hole of an arm.

FIG. 5 shows a state in which an electric cable 310 for the force detecting device 200 is drawn out from the through-hole 122 of the arm end 120. A connector 312 of the electric cable 310 is attached to the electric connector 260 of the force detecting device 200. A cable body 314 of the electric cable 310 can be inserted into the through-hole 122 (see FIG. 2) of the arm end 120 after being spirally drawn around in the space formed between the recess 214 and the arm end 120. Therefore, it is possible to reduce likelihood that excessive stress occurs in the electric cable 310 according to a change in a posture of the robot arm 110. If the cable body 314 of the electric cable 310 is fixed by one or more clamps 216, it is possible to reduce likelihood that the cable body 314 interferes with other members.

Figure 6:
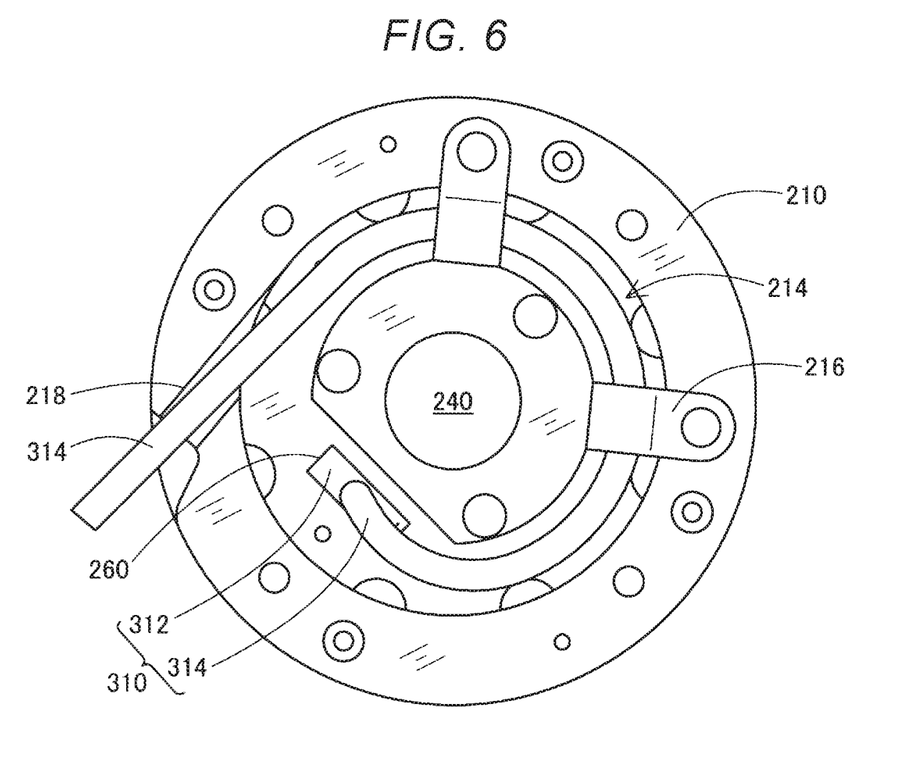
FIG. 6 is a diagram showing a state in which the electric cable for the force detecting device is drawn out to the outside.

FIG. 6 shows a state in which the electric cable 310 for the force detecting device 200 is drawn out to the outside. A groove 218 (see FIG. 4) for drawing out the electric cable 310 to the outside is formed on the bottom surface of the first connecting member 210. When the electric cable 310 for the force detecting device 200 is not inserted into the through-hole 122 of the arm end 120, the cable body 314 of the electric cable 310 can be drawn out to the outside from the first connecting member 210 via the groove 218. Note that the clamps 216 and the groove 218 can be omitted.

As shown in FIG. 3, the second connecting member 220 is a substantially disk-shaped member. A plurality of fixing screws 222 for fixing the second connecting member 220 to an internal member of the force detecting device 200 are provided in the second connecting member 220. A plurality of female screw holes 226 usable for connection to the end effector are provided on the surface on the end effector side of the second connecting member 220. A plurality of female screw holes 224 are also provided on the side surface (the outer circumferential surface) of the second connecting member 220. The female screw holes 224 are usable to attach a handle for direct teaching.

Figure 7:
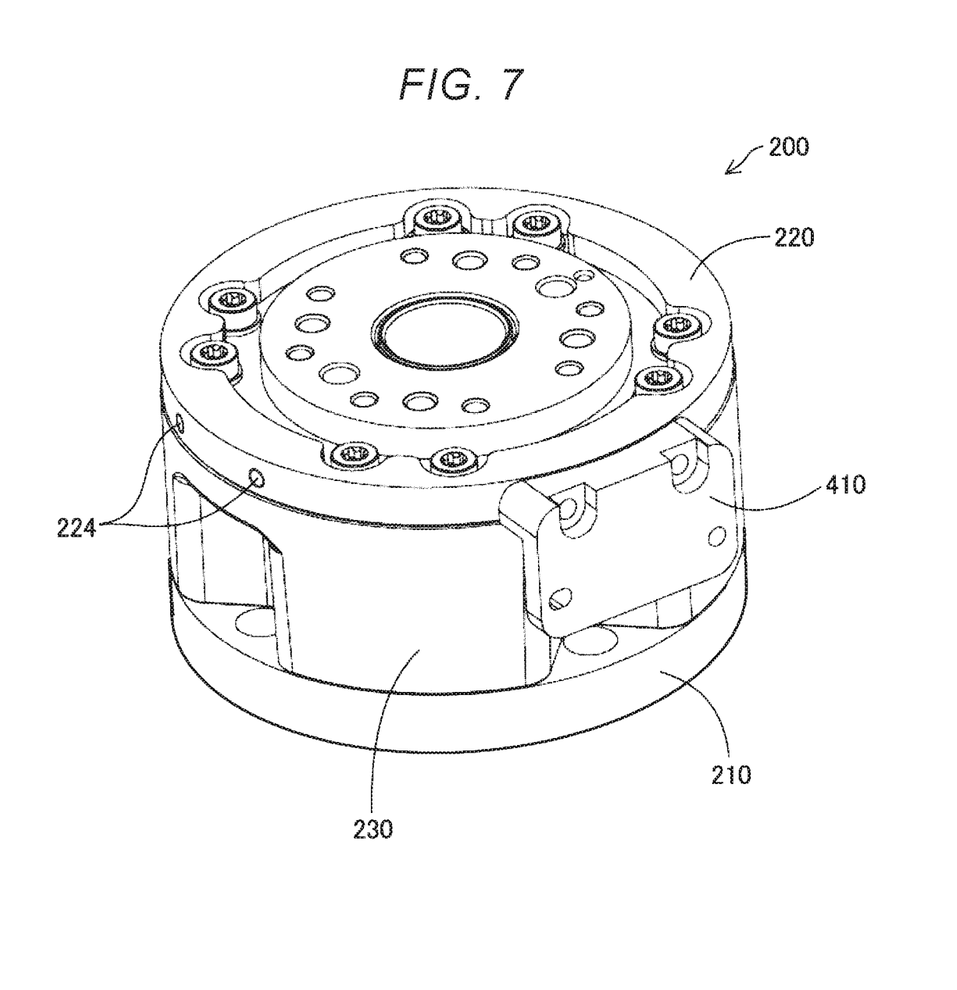
FIG. 7 is a diagram showing a state in which a fixing supporting member of a handle for direct teaching is mounted on the force detecting device.

FIG. 7 shows a state in which a fixing supporting member 410 for attaching the handle for direct teaching is mounted on the force detecting device 200. The fixing supporting member 410 is fixed using the plurality of female screw holes 224 provided on the outer circumferential surface of the second connecting member 220. As explained below, the handle for direct teaching can be attached to the fixing supporting member 410.

As shown in FIG. 3, the side surface member 230 is a substantially cylindrical member. The side surface member 230 includes a plurality of notched sections (notches) 232 provided in the outer circumference of the side surface member 230. The notched sections 232 are portions recessed to the inner side from the outer circumference of the side surface member 230. Therefore, the notched sections 232 can be referred to as "recess" as well. The plurality of fixing screws 213 (see FIG. 1) operable from the plurality of notched sections 232 are attachable to the first connecting member 210. The fixing screws 213 are screws used for connection of the first connecting member 210 and the arm end 120. That is, the fixing screws 213 are respectively inserted into the screw insertion holes 212 of the first connecting member 210 and fastened to the female screw holes 124 (see FIG. 2) of the arm end 120. The heads of the fixing screws 213 are operable from the notched sections 232. As the fixing screws 213, for example, hexagonal socket cap bolts are usable. The fixing screws 213 can be operated from the notched sections 232 of the side surface member 230. Therefore, it is unnecessary to increase the outer diameter of the first connecting member 210 in order to form insertion holes for the fixing screws 213. As a result, it is possible to reduce the outer diameter of the entire force detecting device 200.

Figure 8:
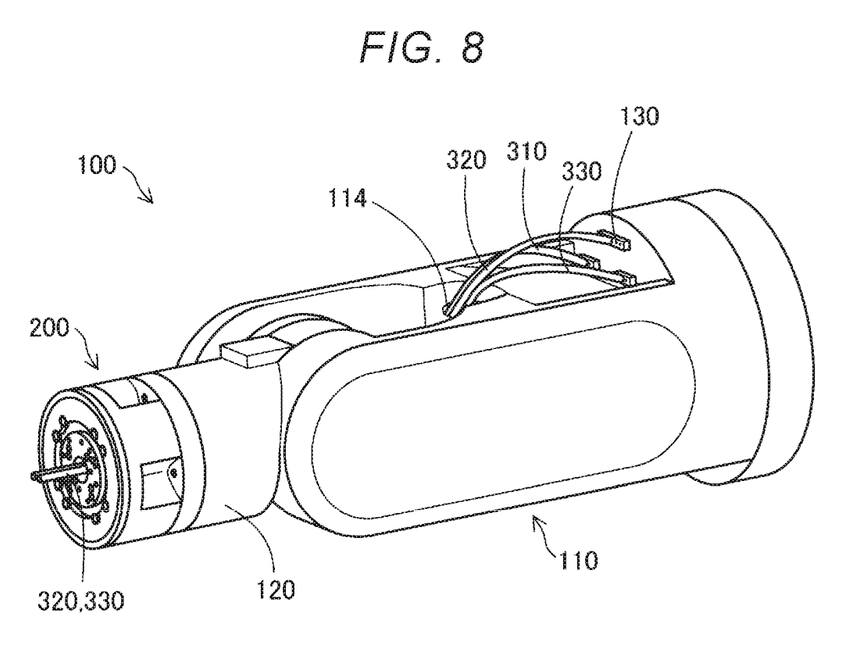
FIG. 8 is a diagram showing a state in which the electric cable is connected to the robot arm.

FIG. 8 is a diagram showing a state in which electric cables 310 to 330 are connected to the robot arm 110. In an example shown in FIG. 8, the electric cables 310 to 330 are connected to the plurality of electric connectors 130 of the robot arm 110. The electric cables 310 to 330 are inserted into the inside of the robot arm 110 via the draw-out hole 114 on the side surface of the robot arm 110 and disposed to pass through a through-hole (not shown in FIG. 8) provided along the center axis of the robot arm 110. The electric cable 310 is a cable for the force detecting device 200 (see FIG. 5). The other two electric cables 320 and 330 are cables for the end effector. The electric cables 320 and 330 are connected to the end effector passing through the through-hole 240 of the force detecting device 200. In the example shown in FIG. 8, the end effector is omitted. Therefore, illustration of the distal end sides of the electric cables 320 and 330 is omitted.

Figure 9:
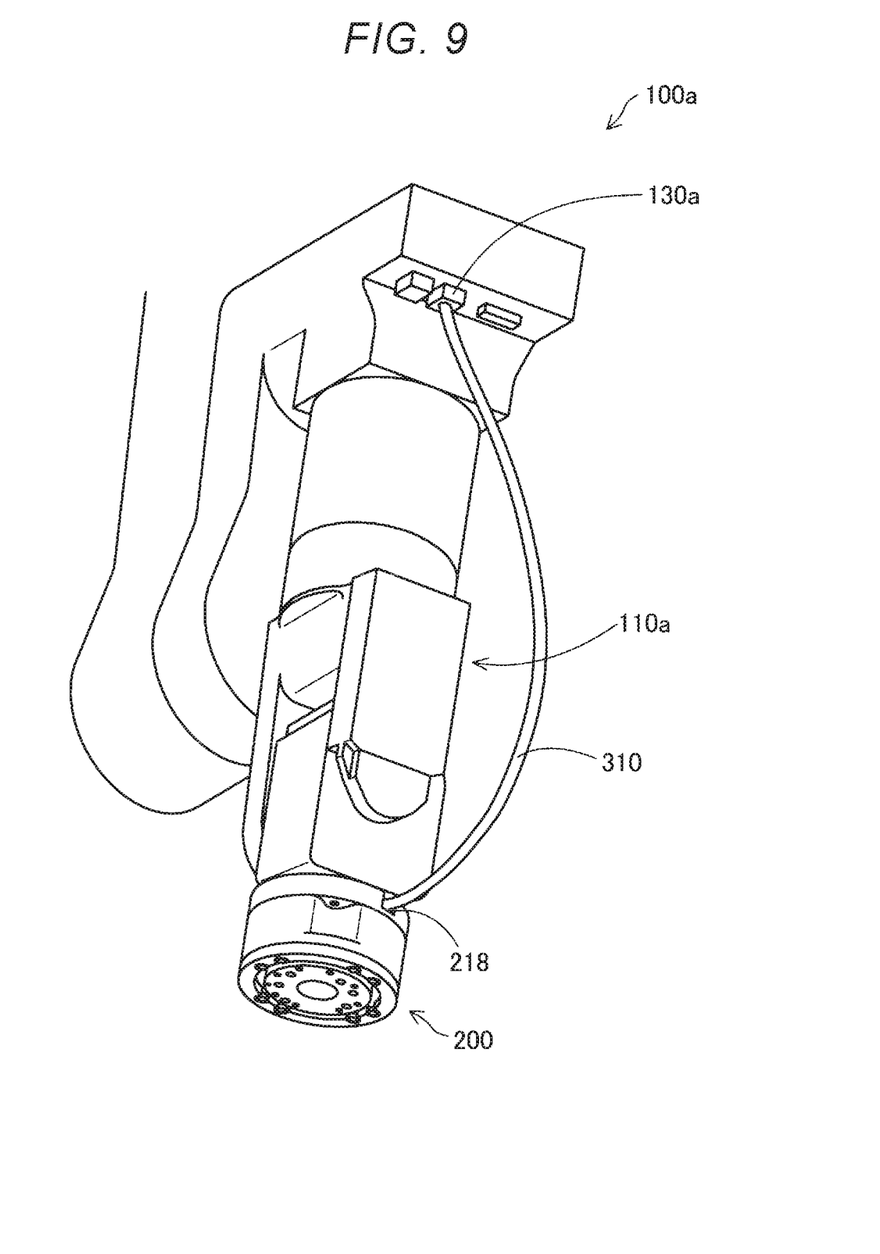
FIG. 9 is a perspective view showing a state in which the force detecting device is mounted on another robot.

FIG. 9 is a diagram showing a state in which the force detecting device 200 is mounted on another robot 100a. In an example shown in FIG. 9, as explained with reference to FIG. 6, the electric cable 310 is drawn out to the outside via the groove 218 provided in the first connecting member 210 of the force detecting device 200. The electric cable 310 is connected to an electric connector 130a provided in a robot arm 110a. In this way, in the force detecting device 200 in this embodiment, the groove 218 for drawing out the electric cable 310 to the outside is formed in the first connecting member 210. Therefore, when the force detecting device 200 is mounted on the robot 100a including an arm end not including a through-hole, the electric cable 310 can be drawn out to the outside via the groove 218 and connected to the electric connector 130a provided in the outer circumference of the robot arm 110a.

Figure 10:
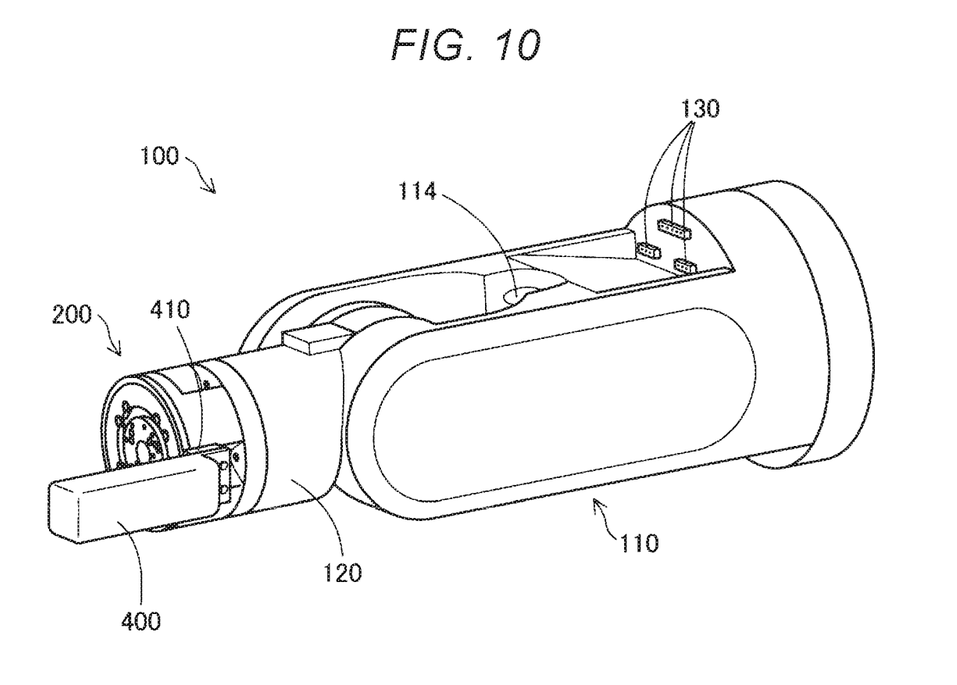
FIG. 10 is a diagram showing a state in which the handle for direct teaching is attached to the force detecting device.

FIG. 10 is a perspective view showing a state in which a handle 400 for direct teaching is attached to the force detecting device 200. As explained with reference to FIG. 7, the plurality of female screw holes 224 usable to attach the handle 400 for direct teaching are provided on the side surface of the second connecting member 220. In an example shown in FIG. 10, the fixing supporting member 410 shown in FIG. 7 is fixed to the side surface of the second connecting member 220 using the plurality of female screw holes 224. The handle 400 is fixed to the fixing supporting member 410. When performing the direct teaching, an operator is capable of moving the robot arm 110 and the end effector to desired positions and postures in a state in which the operator grasps the handle 400 and executing the direct teaching. Note that the handle 400 may be directly fixed to the side surface of the second connecting member 220 using the plurality of female screw holes 224. If such a plurality of female screw holes 224 are provided in the second connecting member 220, the handle 400 for direct teaching can be attached to the force detecting device 200. Therefore, the direct teaching can be easily performed. However, the female screw holes 224 can be omitted.

As explained above, the force detecting device 200 in this embodiment has structure in which the electric cable 310 for the force detecting device 200 is insertable into the through-hole 122 of the arm 110 from the recess 214 located on the outer surface of the force detecting device 200. Therefore, the electric cable 310 can be inserted into the through-hole 122 of the arm 110 without being drawn around on the outside of the force detecting device 200. Further, since the force detecting device 200 includes the space formed by the arm 120 and the recess 214 formed in the force detecting device 200, the electric connector 260 can be provided in the recess 214. Therefore, it is possible to reduce likelihood that the electric cable 310 for the force detecting device 200 causes interference with other objects such as other cables. It is easy to lay out the electric cable 310.

The invention is not limited to the embodiment, the examples, and the modifications explained above and can be realized in various configurations without departing from the spirit of the invention. For example, the technical features in the embodiment, the examples, and the modifications corresponding to the technical features in the aspects described in the summary can be replaced or combined as appropriate in order to solve a part or all of the problems described above or achieve a part or all of the effects described above. Unless the technical features are explained as essential technical features in this specification, the technical features can be deleted as appropriate.

The entire disclosure of Japanese Patent Application No. 2017-219581, filed Nov. 15, 2017, is expressly incorporated by reference herein.

What is claimed is:

1. A force detecting device mounted on a robot arm including an arm including a through-hole, the force detecting device comprising:
   a recess located on an outer surface of the force detecting device; and
   an electric connector provided in the recess, wherein
   an electric cable for the force detecting device attached to the electric connector is inserted into the through-hole, and
   the electric cable is inserted into the through-hole after being spirally drawn around in a space formed by the arm and the recess.

2. A force detecting device mounted on a robot arm including an arm including a through-hole, the force detecting device comprising:
   a recess located on an outer surface of the force detecting device;
   an electric connector provided in the recess;
   a substantially ring-shaped first connecting member connected to the arm; and
   a second connecting member connected to an end effector, wherein
   an electric cable for the force detecting device attached to the electric connector is inserted into the through-hole.

3. The force detecting device according to claim 2, further comprising a side surface member provided between the first connecting member and the second connecting member, wherein
   the side surface member includes a plurality of notches provided in an outer circumference of the side surface member, and
   the first connecting member includes a plurality of screw insertion holes into which a plurality of fixing screws operated from the plurality of notches are inserted, a plurality of fixing screws configured to connect the first connecting member and the arm.

4. The force detecting device according to claim 2, wherein a plurality of female screw holes for attaching a handle for direct teaching to the second connecting member are provided on an outer circumferential surface of the second connecting member.

5. A robot system comprising:
a robot includes an arm including a through-hole; and
a force detecting device mounted on the arm, wherein
the force detecting device includes:
- a recess located on an outer surface of the force detecting device and an electric connector provided in the recess,
- a substantially ring-shaped first connecting member connected to the arm; and
- a second connecting member connected to an end effector, and an electric cable for the force detecting device attached to the electric connector is inserted into the through-hole.

6. The robot system according to claim 5,
wherein the electric cable is inserted into the through-hole after being spirally drawn around in a space formed by the arm and the recess.

7. The robot system according to claim 5,
wherein the force detecting device further includes a side surface member provided between the first connecting member and the second connecting member, wherein the side surface member includes a plurality of notches provided in an outer circumference of the side surface member, and the first connecting member includes a plurality of screw insertion holes into which a plurality of fixing screws operated from the plurality of notches are inserted, a plurality of fixing screws configured to connect the first connecting member and the arm.

8. The robot system according to claim 5,
wherein a plurality of female screw holes for attaching a handle for direct teaching to the second connecting member are provided on an outer circumferential surface of the second connecting member.

9. The robot system according to claim 7,
wherein a plurality of female screw holes for attaching a handle for direct teaching to the second connecting member are provided on an outer circumferential surface of the second connecting member.

* * * * *